fluid passage normally aligned with the fluid passage of the pin, and a fluid communication between the opposite sides of the segment and intersecting the fluid passage in the segment.

9. In a coupling, bearing members, a coupling pin inserted through the bearing members and having a segmental portion, a segmental rocker opposite the segmental portion of the pin, and a fluid channel in the ends of the segmental rocker.

10. In a coupling, bearing members, a coupling pin inserted through the bearing members and having a segmental portion, a segmental rocker opposite the segmental portion of the pin, and a fluid communication between the opposite sides of the segmental rocker.

HARRY A. KNOX.
BERT F. BAKER.

Oct. 2, 1934.  H. L. KRAEFT  1,975,108
METAL CRIBBING
Filed Aug. 8, 1931  7 Sheets-Sheet 1
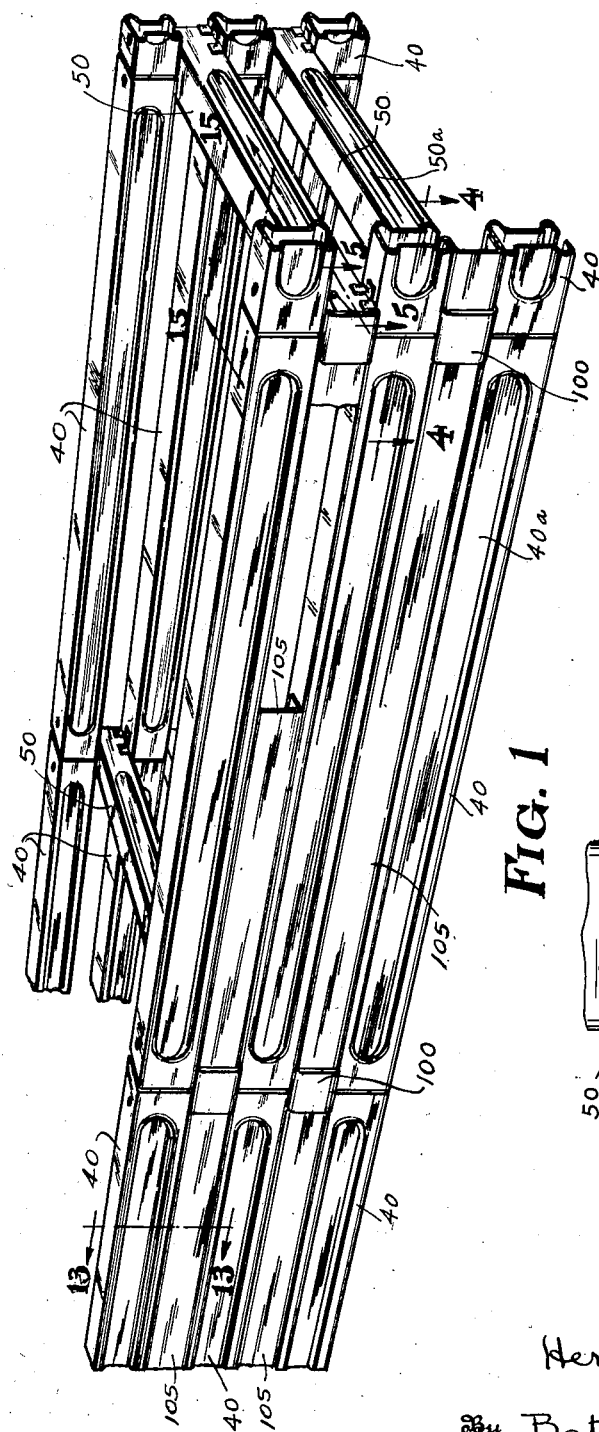
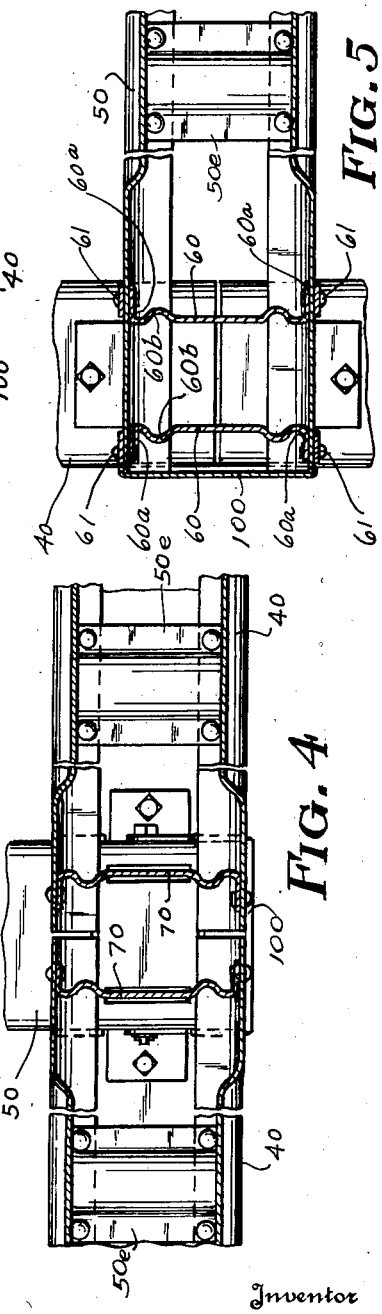
Inventor
Herman L. Kraeft
By Bates, Golrick & Teare
Attorneys

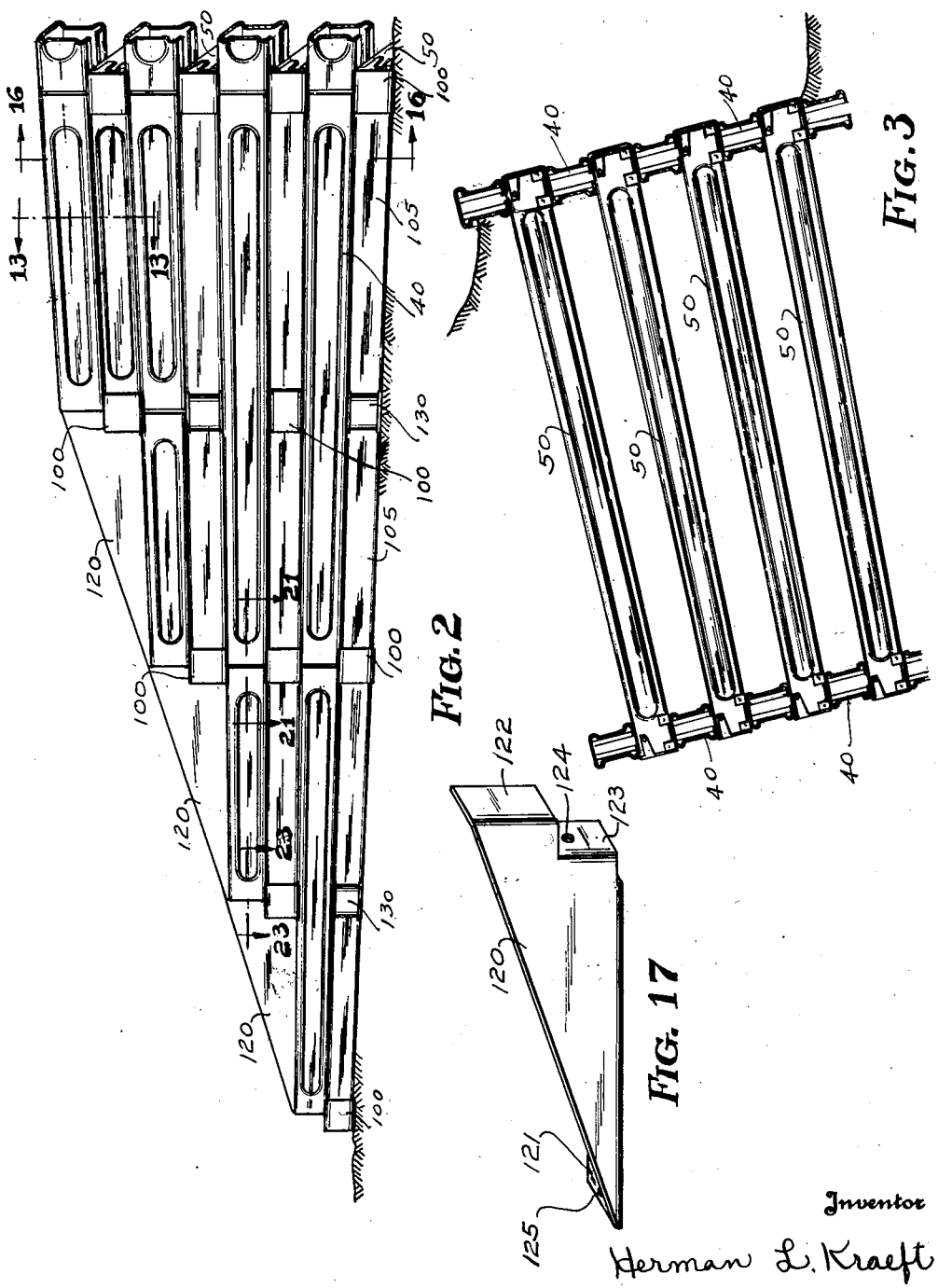

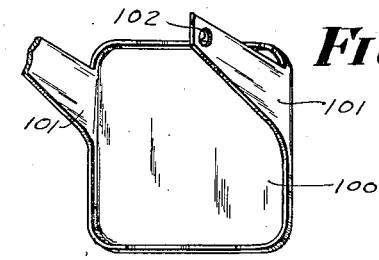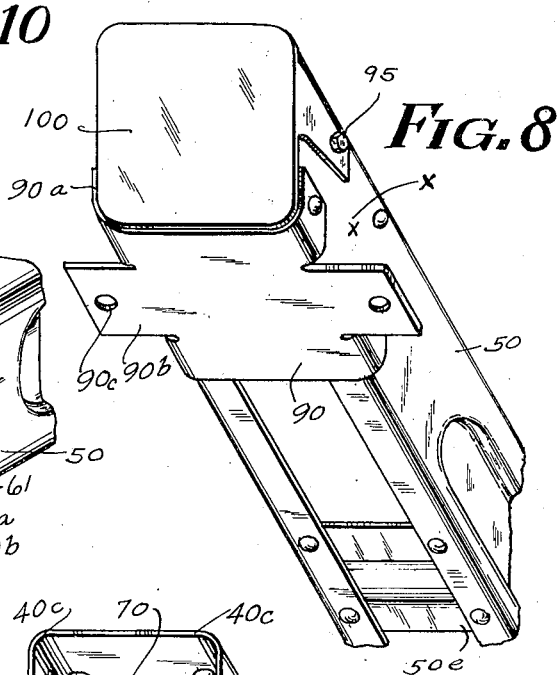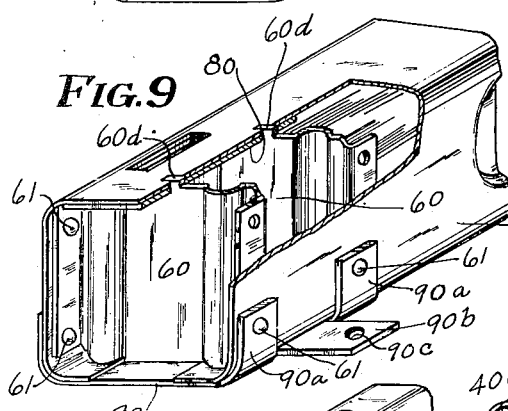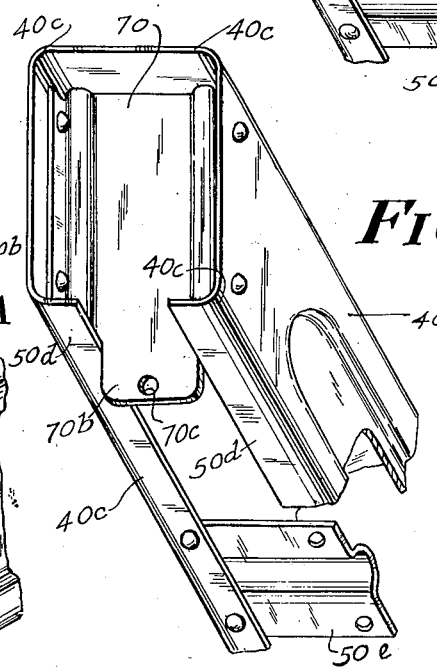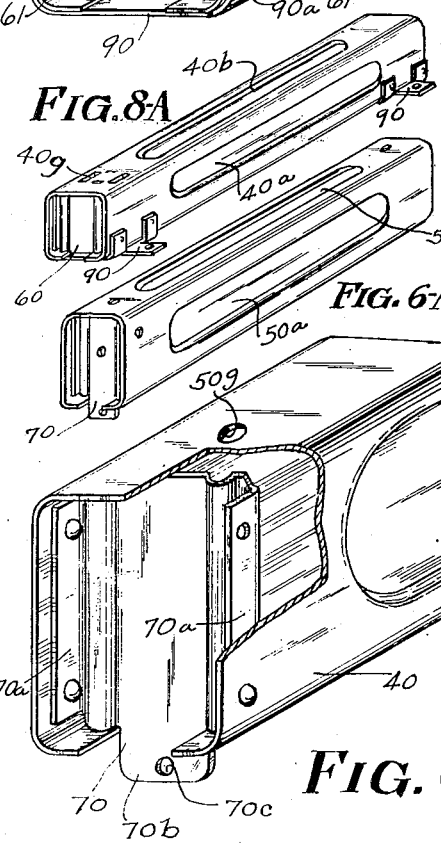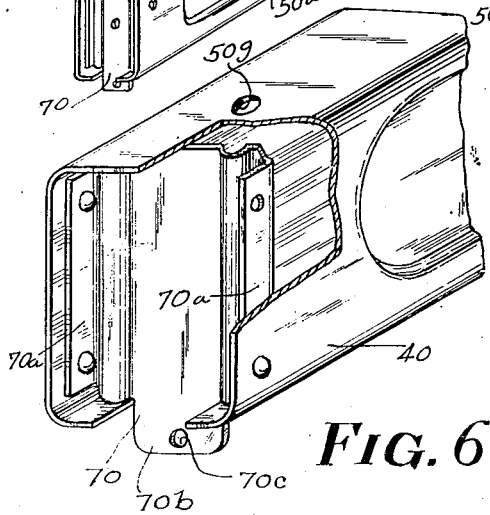

Oct. 2, 1934. H. L. KRAEFT 1,975,108
METAL CRIBBING
Filed Aug. 8, 1931 7 Sheets-Sheet 4
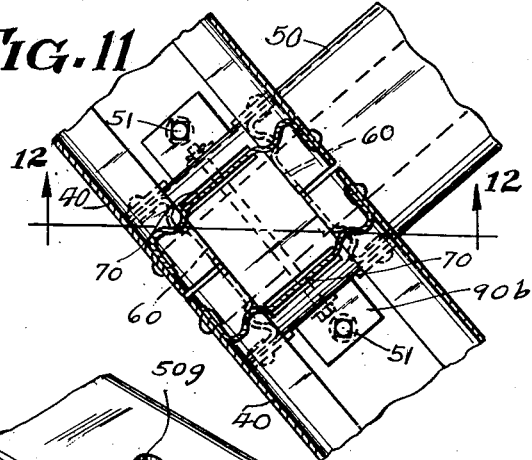
FIG. 11
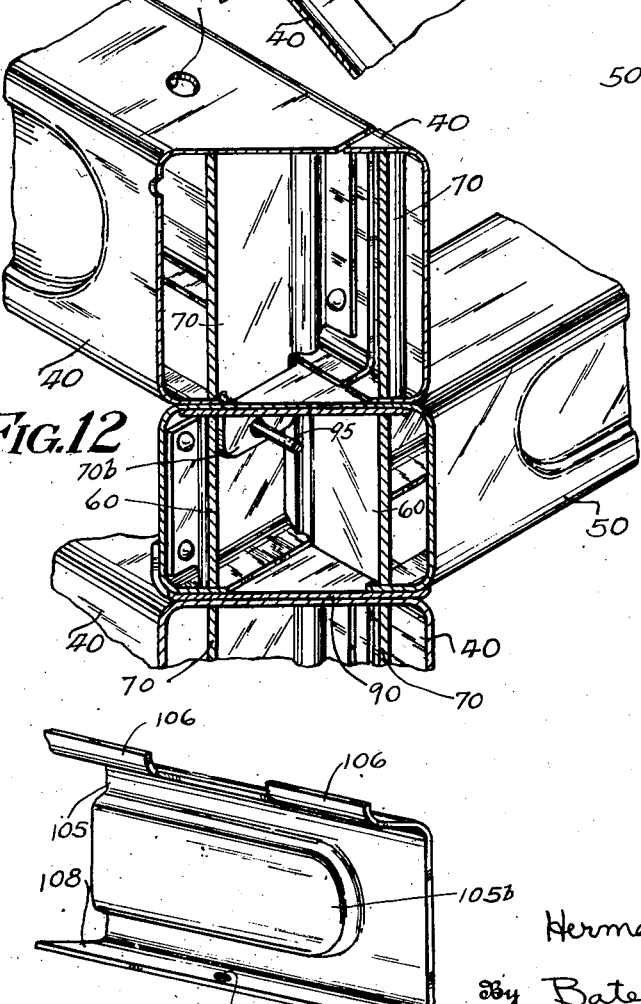
FIG. 12
FIG. 14
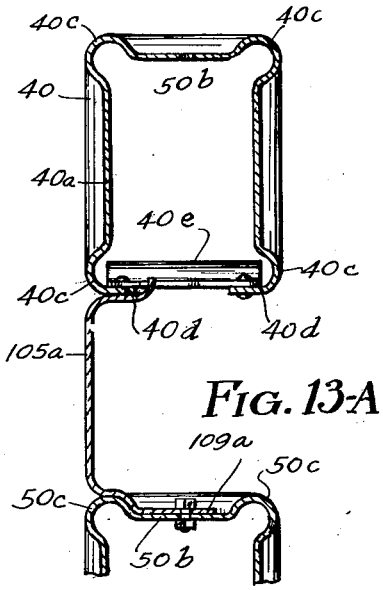
FIG. 13-A
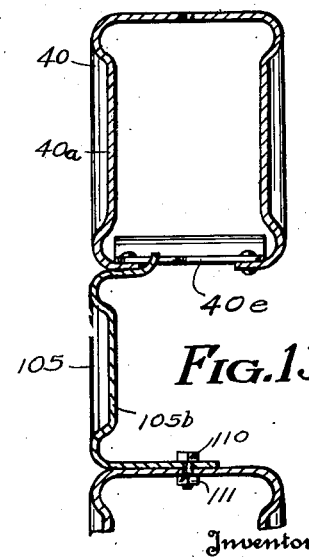
FIG. 13
Inventor
Herman L. Kraeft
By Bates, Goldrick & Teare
Attorneys Oct. 2, 1934.  H. L. KRAEFT  1,975,108
METAL CRIBBING
Filed Aug. 8, 1931   7 Sheets-Sheet 5
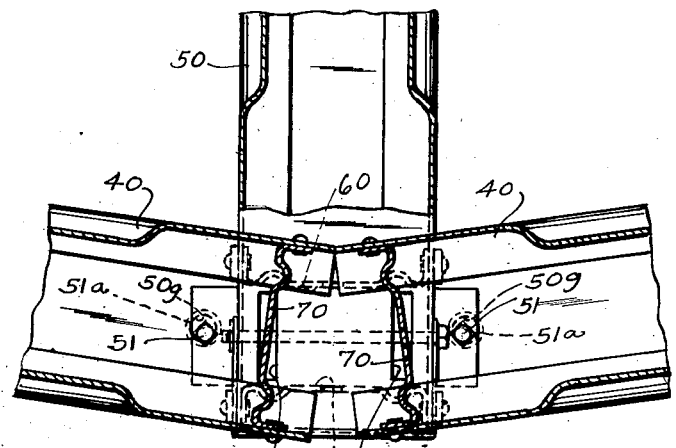
FIG. 16
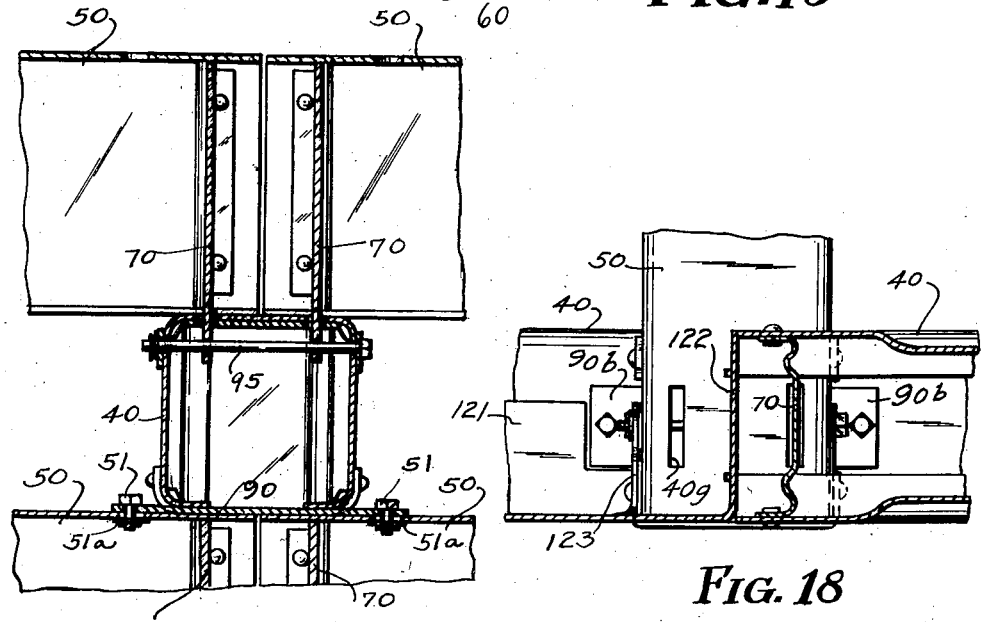
FIG. 15
FIG. 18
Inventor
Herman L. Kraeft
By Bates, Goldrick & Teare
Attorneys Oct. 2, 1934.     H. L. KRAEFT     1,975,108
METAL CRIBBING
Filed Aug. 8, 1931     7 Sheets-Sheet 6
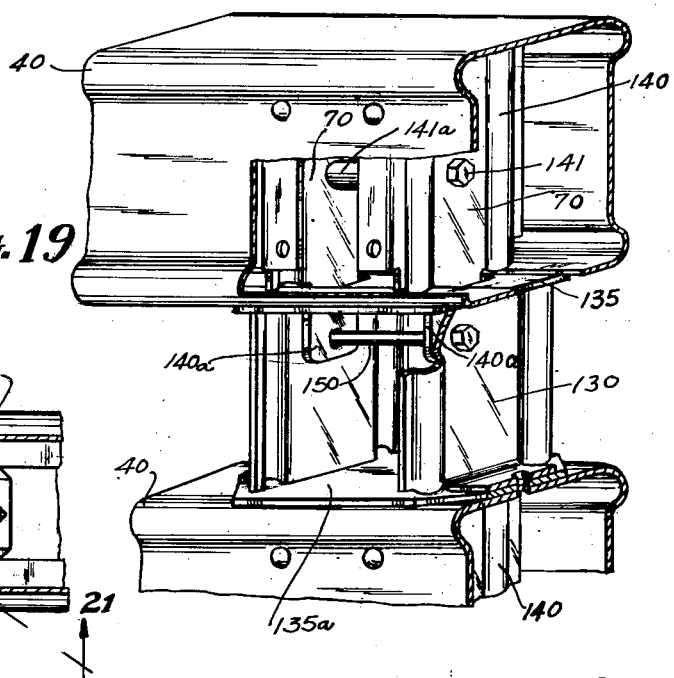
FIG. 19
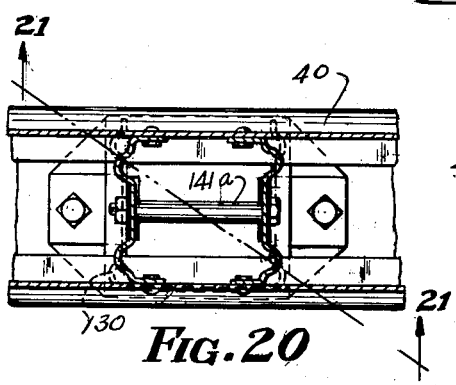
FIG. 20
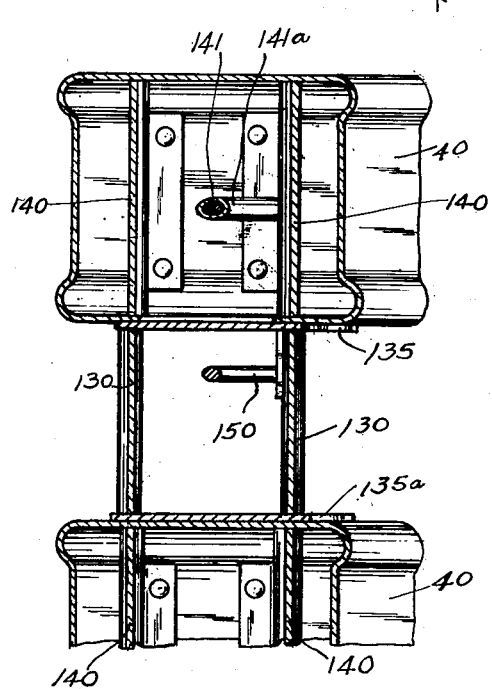
FIG. 21
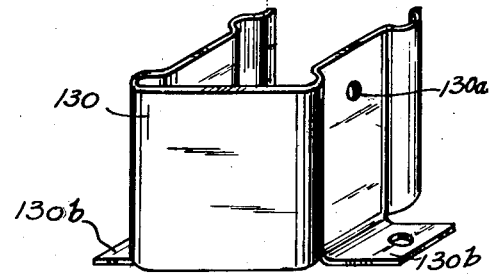
FIG. 23
FIG. 22
Inventor
Herman L. Kraeft
By Bates, Golrick & Teare
Attorneys Oct. 2, 1934.    H. L. KRAEFT    1,975,108
METAL CRIBBING
Filed Aug. 8, 1931    7 Sheets-Sheet 7
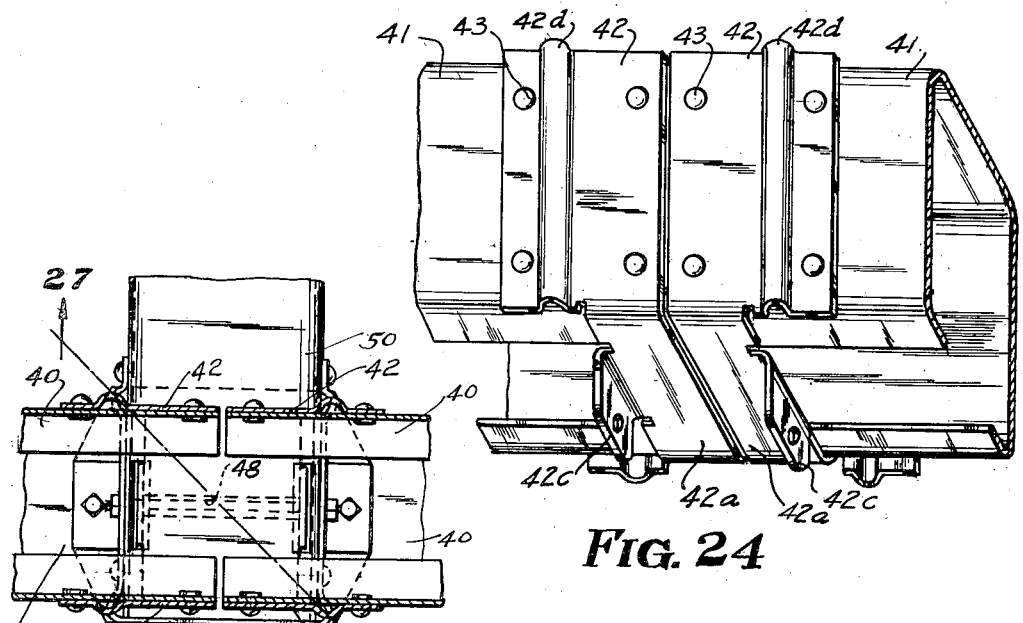
FIG. 24
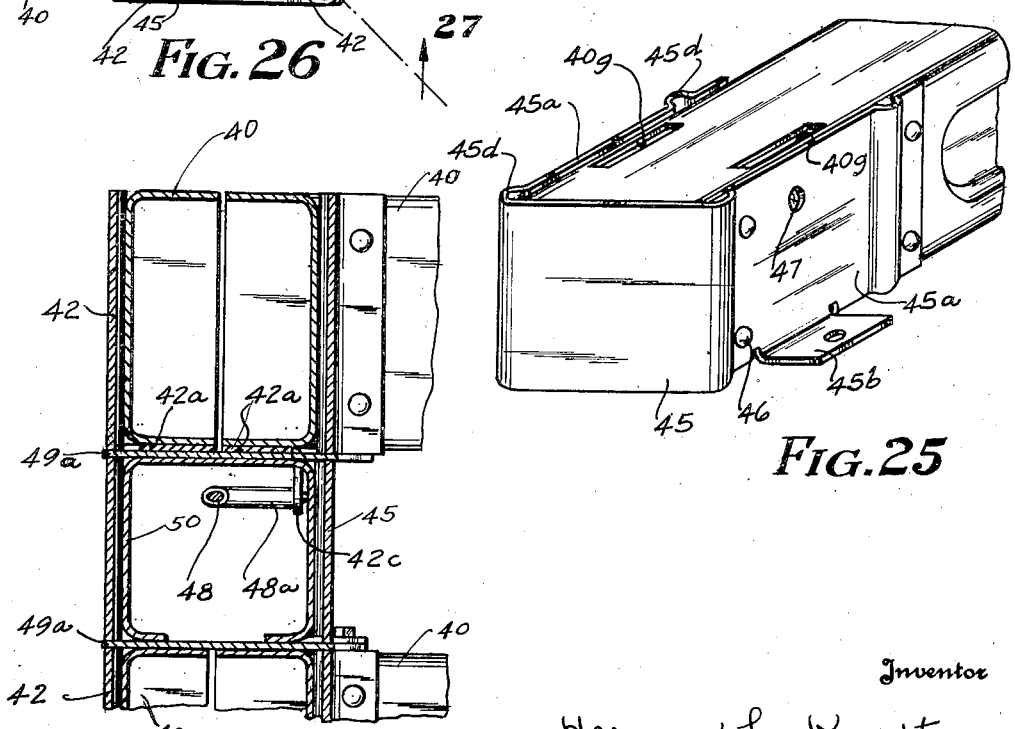
FIG. 26
FIG. 25
FIG. 27
Inventor
Herman L. Kraeft
By Bates, Goldrick & Teare
Attorneys Patented Oct. 2, 1934

1,975,108

UNITED STATES PATENT OFFICE 1,975,108

METAL CRIBBING

Herman L. Kraeft, Cleveland, Ohio, assignor to The Murray Ohio Manufacturing Company, Cleveland, Ohio, a corporation of Ohio Application August 8, 1931, Serial No. 555,966

45 Claims. (Cl. 61—47)

The general object of the present invention is the provision of a cribbing structure wherein all the elements thereof are formed of metal having such formation characteristics as to permit the structure to be used for all purposes to which concrete cribbing structures may be utilized.

Another object of the present invention is the provision of an all metal cribbing structure having the respective members comprising the same developed in such manner that the cribbing elements may be assembled in proper relationship under a wide range of varying engineering conditions.

A more specific object of my invention is the provision of a cribbing construction wherein the vertical load which the structure is required to carry, is concentrated in column formations, which include reinforced bonding regions of the headers and stretchers, and whereby the bodies of the headers and stretchers may comprise relatively thin sheet metal formations of such shape as to be manufactured at a great economical advantage.

A further object is the provision of novel constructions for sheet metal header and stretcher ends, directed to the provision of inter-bonding and inter-engaging of the header and stretcher ends, and the end structures being of such nature as to comprise reinforcements capable of assuming the accumulated compressive load to which the cribbing structure is subjected when assembled and placed in use.

Other objects of my invention will become apparent from the hereinafter set forth descriptions of some forms of my invention, as illustrated in the drawings, and the essential characteristics thereof are summarized in the claims.

In the drawings, Fig. 1 is a perspective view of part of a cribbing structure embodying the features of my invention; Fig. 2 is a perspective cross-section, as viewed from the front and the section being taken at a higher point of the cribbing structure; Fig. 3 is a transverse cross-sectional view of the cribbing structure, as viewed through a section of the bank of soil to be retained in place by the structure; Fig. 4 on Sheet 1 comprises a fragmentary cross-sectional plan view corresponding to the plane defined by line 4—4 of Fig. 1, and showing the general bonding relationship of header and stretcher members; Fig. 5 is a view similar to Fig. 4, and corresponding to the cross-section defined by a plane extending in the direction indicated by the line 5—5 of Fig. 1; Fig. 6 is a perspective view of a reinforced end of a stretcher member with part of the stretcher body broken away to more clearly show the reinforced end structure thereof; Fig. 7 is a perspective view of the stretcher end showing the underside of a stretcher end; Fig. 8 is a perspective view of a header end showing the underside structure thereof, while Fig. 9 is a perspective view of the header end with part of the end structure removed to show the reinforced structure of the header end; Fig. 10 is a perspective view of a closure member which may be used to enhance the appearance of the header end; Fig. 11 on Sheet 4 is a cross-sectional plan view taken through abutting stretcher ends showing the relation thereof to a header end, this figure being similar to Fig. 4 on Sheet 1; Fig. 12 is a perspective diagonal cross sectional view taken through the bonding header and stretcher ends substantially along the plane indicated by the line 12—12 in Fig. 11; Fig. 13 is a fragmentary cross-sectional view taken through adjacent stretchers substantially along the plane indicated by the line 13—13 of Fig. 1; Fig. 14 is a perspective view of part of a filler element which may be used in the cribbing structure; Fig. 6A is a modified form of the stretcher construction shown in Fig. 6, while Fig. 8A is a modified form of the header structure shown in Fig. 8; Fig. 13A is a cross-sectional view substantially the same as Fig. 13, with the exception that the stretcher structure shown in Fig. 13A corresponds to the stretcher structures shown in Fig. 6A; Fig. 15 comprises a cross-sectional elevation showing the inter-connected relationship of the bonding ends of the headers and stretchers, and Fig. 16 is a cross-sectional view illustrating the bonding relationship of headers and stretchers when a bend or change of direction of extension is desired in the wall structure of the cribbing; Fig. 17 comprises a perspective view of the retaining member utilized for finishing a declining end of a cribbing structure, while Fig. 18 is a cross-sectional view showing the manner of attachment of the member shown in Fig. 17 to the header and stretcher members; Fig. 19 is a perspective cross-sectional view of the pillow block structure in the manner of reinforcing stretcher members when such pillow block is used; Fig. 20 is a cross sectional view taken through a stretcher member shown in Fig. 19; and Fig. 21 is a view taken through the pillow block construction members along the plane defined by the line 21—21 of Fig. 20; Figs. 22 and 23 comprise metal elements embodied in the structure shown in Fig. 19; Fig. 24 is a perspective view of two abutting stretcher ends showing a modified form of reinforcement thereof; Fig. 25 is a perspective view of a header illustrating a modified form of end reinforcement thereof, the end being adapted to interengage and bond with stretcher ends illustrated in Fig. 24; Fig. 26 is a fragmentary cross-sectional plan view of the stretcher and header member shown in Figs. 24 and 25, respectively, illustrating their bonding relationship when placed in the wall; and Fig. 27 is a diagonal cross-sectional view taken along the plane indicated by the line 27—27 of Fig. 26.

My invention contemplates the provision of a cribbing structure formed completely of metal and comprising header and stretcher members developed in such manner that economy may be effected by developing forms which will produce the greatest available physical strength in the use of such metal, while permitting a ready adaptation of the headers and stretchers to structural assemblies, and which assemblies will meet the varying requirements of cribbing structures in general, when placed in use.

I have found that I may form the header and stretcher members of a relatively thin gauge, weather-resisting or weather-proof sheet metal, which gauge would not afford sufficient compressive strength required of a cribbing structure by reason of the shapes I employ to obtain other convenience and advantages in the cribbing structure. But these header and stretcher shapes have the ends thereof reinforced in such manner that when the headers and stretchers are assembled in the cribbing structure with the ends thereof in bonding relationship, the individual reinforcing means carried by each stretcher and header will bear definite relationships to the headers and stretchers in the courses above and below, whereby the compressive strength of the end walls of the headers and stretchers, where the same are bonded together, may be increased in an economical manner and to such an extent as to meet all of the safety factor requirements when the cribbing structure is subjected to severe compressive loads.

I have found that for convenience of manufacture, as well as for the obtaining of maximum beam strength per given gauge of metal, both the header and stretcher bodies may comprise single sheets of metal bent to provide substantially flat top, bottom and side walls, the beam formation being substantially rectangular in cross-section. Such beam formations may be of any desired standard lengths, and when the end structures thereof are reinforced, the beams may be six and eight feet in length and of such light weight as to permit a single workman to handle the units without undue physical effort.

These rectangular beam formations of both headers and stretchers have the ends thereof reinforced both laterally and vertically by sheet metal members preferably of a heavier gauge than the gauge of the metal forming the bodies thereof. These reinforcing elements may be of such character as to embody and comprise interengaging means for securing the bonded ends of headers and stretchers together, whereby, if desired, a number of headers and stretchers may be secured together and moved, as a section of the entire structure, into place, the latter being desirable particularly in marine engineering. The specific shapes of the various elements comprising the members of the cribbing structure and the cooperative characteristics of these shapes will be set forth hereinafter in detail.

Referring to the drawings, in Figs. 1, 2 and 3 I illustrate a soil retaining wall, such, for example, as is frequently utilized in railroad, highway and other civil engineering practice, and this structure in general comprises the stretcher members 40, laid in horizontal courses with the abutting ends thereof in substantially equal bonding relationship with the ends of header members 50. If desired, the header members and stretcher members may be of the same length or the stretcher members may be of a greater length than the header members or headers and stretchers of different lengths may be embodied within a single cribbing structure as I will further explain.

As will be noted, the side walls of the stretchers 40 and the side walls of the header members 50 have depressed panel formations, as shown at 40a and 50a in the various figures of the drawings, which, in the present instance, is the simplest manner of treating the sheet metal to increase the beam strength of both headers and stretchers intermediate the ends thereof, and by thus forming the bodies of the headers and stretchers a thinner gauge metal may be used for the body formations of the headers and stretchers than if the side walls of the headers and stretchers comprised a sheet metal formation with said walls lying in common planes. Such panelling or other equivalent panelling of the metal sheet comprising the stretcher and header bodies may be effected by placing the sheet in a press before the same is bent to rectangular cross-sectional form, and, if desired, as shown in Figs. 6A and 8A, the top panelling 40b and 50b may be effected in the sheets at the time the panelling 40a and 50a are being formed in the sheet. Thereafter the panelled sheets may be bent to the rectangular form shown by any convenient means. However, this bending is effected in such manner as to obtain a substantial rounding of the longitudinal edges of the beams, as shown at 40c and 50c (note Figs. 7, 8, 13 and 13A). This rounding of the longitudinal edges of the beams has the effect of preserving the inherent strength of the metal and prevents the development of internal cleavages and fractures in the metal sheet.

I prefer to use a sheet of such width that when bent to the rectangular forms shown, the bottom walls will comprise two opposed flange portions 40d and 50d, on the stretchers and headers, respectively, and which are disposed in a common plane and spaced apart a sufficient distance to permit manual access to the interiors of both headers and stretchers to facilitate the assembly of the header and stretcher members when being placed in the cribbing structure. The beam portions 40d and 50d may be tied together by transverse stiffening members 40e and 50e, which may be secured to the flange portions 40d and 50d of the stretchers and headers, respectively, in any suitable manner, such, for example, as riveting, welding or bolting. The drawings, however, illustrate the use of rivets for the purpose.

By reducing the gauge of sheet metal used in the bodies of headers and stretchers for the purposes of economy in manufacture and in saving of labor when the units are being assembled, the crushing strength of the header and stretcher ends when assembled in bonding relationship would not be sufficient to meet the compressive load bearing requirements of a cribbing structure, and accordingly, I reinforce the header and stretcher ends, as shown in Figs. 4, 5, 6, 7 and 8. The header reinforcements particularly illustrated in Figs. 5, 9 and 12, comprise transverse plates 60, extending from side wall to side wall of the header ends, and it will be noted that the panelling 50a of the header side walls terminates a substantial distance from the ends of the header beams, and accordingly, the plate members 60 are of sufficient width to contact internally with the ends of the side walls of the header members and are secured thereto by means of flange formations 60a and rivets 61. If desired, these plate members may be provided with corrugations 60b for increasing the column or compressive load bearing strength thereof. The members 60 are disposed in spaced apart relation, and this spacing bears a definite relationship to the position of similar end reinforcing plate members 70, one of which is disposed interiorally of each of the ends of the stretcher members, whereby when the headers and stretchers are placed in assembled relation, the plate members 60 of the header ends and plate members 70 of the stretcher ends will have a definite vertical load bearing relationship as illustrated in Figs. 11 and 12, that is, certain portions of these plate members will be disposed in vertical column load bearing relationship. It will be noted by reason of this arrangement of the reinforcing plates relative to the ends of the headers and stretchers that the ends of the side walls of the headers and stretchers are relieved of bearing the entire vertical compressive load, the load being distributed between these ends of the side walls of the headers and stretchers and the reinforcing plates 60 and 70, and that by reason of the flanges 60a on the header plates and the flanges 70a on the stretcher plates, the side walls are stiffened to prevent any tendency to buckle when the header and stretcher ends are subjected to extreme compressive loads.

If desired, transverse plates (see Figs. 9 and 12) may be associated with the header or the stretcher ends for strengthening the top and bottom walls of the headers and stretchers. I show such a plate 80 interposed between the upper edges of the plates 60 and the plates 60 are provided with lugs 60d, which extend through holes of complementary formation formed in the plate 80, and the top wall of the header end has similar holes formed therein, whereby the lugs 60d will retain the plate 80 in position relative to the end of the top wall of the header ends. In a similar manner, the bottom wall of the header end may be reinforced by a transverse plate 90, which I prefer to have exteriorly disposed relative to the header and for an additional function to be hereinafter described. This plate 90 may have upwardly extending lugs 90a, formed thereon, which may be secured to the side walls of the header ends by the rivets 61, which secure the plates 60 interiorly to the side walls of the header ends.

It should be noted in Fig. 12 that both header and stretcher plates extend from the top walls to the bottom walls interiorly of both headers and stretchers, whereby compressive loads may be transmitted vertically through the cribbing structure, wherever the column formations exist by reason of the bonding relationship of the headers and stretchers, as hereinbefore described, and that beam stresses upon transverse portions of the header and stretcher end walls are taken by the reinforcements, thus eliminating any tendency of the thin gauge metal comprising the headers and stretchers to buckle.

It is frequently desirable to have cribbing structures wherein the headers and stretchers are secured together, whereby subassemblies or sections of cribbing may be built up and shifted to the place of use. This securing of the headers and stretchers, together is also resorted to on occasions where considerable vibration may exist in the soil to be retained by the cribbing, and accordingly, I provide such interengaging or securing means for the header and stretcher ends, and which may comprise part of the elements or plates 60 and 70, or in association therewith.

For example, the reinforcing plate 70 of the stretcher may be provided with depending lug portions 70b, extending downwardly a substantial distance and provided with a perforation 70c. The header ends are provided with rectangular openings or perforations 40g, in such position that when the abutting stretcher ends are placed in bonding relationship to the header ends the extensions 70b of the plates 70 will pass through the openings 40g in the header ends, and the side walls of the header ends are provided with aligned openings 40h, which openings also align with the perforations 70c of the stretcher plate 70, whereby pins or bolts 95 may be passed therethrough, thus securing a pair of stretcher ends to the upper portion of a header end.

To secure the lower portion of the header end to the stretcher ends disposed therebeneath, I provide lugs or extensions 90b to the transverse plate member 90, which are provided with perforations 90c, and which perforations are brought into alignment with perforations 50g provided in the top walls of the stretcher ends, whereby bolts may be passed through perforations 90c and 50g and interiorly disposed nuts on the bolts may be held, or the bolts tightened by reason of the open wall formation of the bottom walls of the stretcher members.

For the purpose of enhancing the appearance of the exposed wall face of the cribbing structure, and for the purpose of preventing the depositing of extraneous matter therein, suitable closure means may be provided on the exposed end of the header, and I propose to use a closure cap, which, when attached to the header end, will have the exposed surface thereof disposed substantially in the general plane of the face of the cribbing wall which is exposed. In Fig. 10 I show one form of suitable means, comprising a cap member 100, consisting of a pressed metal sheet having lugs 101 formed thereon, with suitable perforations 102, which, when the closure cap is placed in position on the end of the header, will align with the perforations 40h formed in the ends of the side walls of the header, for the reception of the pin or bolt 95 to hold the cap in place.

In Fig. 14 I show in perspective a so-called filler member, utilizable for the purpose of closing the longitudinal spaces between courses of stretchers above and below. This filler member 105 is of such form as to have the top longitudinal edge thereof formed to suitably engage the underside of a stretcher when submitted to a lateral load pressure, while the bottom thereof may be secured to the top walls of the stretcher below. The member 105 is shown as being provided with lug portions 106, formed to extend upwardly to engage the outer, bottom flange 40d of the stretcher, in the manner shown in Fig. 13, there being an inwardly extending flange 108, formed on the filler member 105, suitably perforated, as shown at 109, and whereby a bolt 110 may extend therethrough and through an aligned perforation formed in the top wall of the stretcher. A nut 111 on the bolt may be reached by the workman by reason of the open bottom construction of the stretchers. It will be noted from the cross-section shown in Fig. 13 that the exposed surface of the filler 105 lies substantially in the general plane of the exposed wall face of the cribbing structure, and it may be panelled, as shown at 105b.

In Fig. 13A the filler member 105a is of substantially the same formation as the filler structure 105, shown in Fig. 14, with the exception that the bottom flange 109a is formed to be complementary to the contour of the top wall of the stretcher when said top wall has the panel 50b formed therein.

In Fig. 17 I show a diagonally formed topping member 120, which may serve as a soil retaining means when a cribbing structure of stepped-down formation, such as is illustrated in Fig. 2, is being used. The member 120 is provided with a suitable bottom flange 121 for bearing on the stretcher top walls and end flanges 122 and 123 provide a contact with the end of a stretcher and the end of the side wall of the header respectively. Suitable perforations 124 and 125 are provided for securing the member to the end of the header wall and the top wall of the stretcher by bolts or other suitable means. A cross-sectional plan view is shown in Fig. 18, which illustrates the relationship of the flanges 122 and 123 of the member 120 to the header end and stretcher top. It will be noted in Fig. 18 that the flange 121 is cut away to provide clearance for the lug 90b, formed on the member 90, carried by the header 50.

Fig. 16 is a cross-sectional plan view illustrating the possibilities of variation in the outer wall of the cribbing structure when it is desired to change the direction extension of the wall. It should be noted in this figure that the openings 40g, hereinbefore described as being formed in the header ends, are of sufficient width to permit the extensions 70b on the plate members 70 of the stretchers to be disposed angularly relative to the walls of the openings 40g, whereby such alignment displacement in the cribbing structure may be effected.

Figs. 19 to 23 inclusive illustrate the use of a pillow block in the stretcher wall, there being occasion for the use of such an arrangement when it is desired to have headers in only every second course of stretchers, and also where stepped-back formations are required in the cribbing structure. The stretcher members are reinforced intermediate the ends thereof to obtain an alignment, with the walls of the pillow block, of stretcher reinforcing plates and thus cause a direct transmission of the vertical loads on the stretcher beams through the aligned vertical walls of the pillow blocks and plates, and thus prevent buckling of the stretcher side walls. This structure also applies to headers when step back formation is desired.

The pillow block structure may comprise a U-shaped member 130, as shown in Fig. 23, and bearing plates 135 and 135a are interposed between the top edges of the member 130 and the under open side of the stretchers 40. The plate 135 is perforated, whereby extensions 140a, formed on the stretcher reinforcing members 140, may extend therethrough and the extensions are suitably perforated, whereby a bolt 150 may extend through aligned openings 130a formed in the side walls of the pillow block member 130, and perforations formed in the extensions 140a, thus affording securement of the upper stretcher members to the pillow block. Lugs 130b are provided on the member 130, extending in a horizontal direction and suitably perforated, whereby the lower portion of the pillow block 130 may be secured to the upper wall of the under stretcher member 40. The bearing plate 135a is interposed between the top wall of the under-stretcher member 40 and the lower edges of the pillow block 130. It will be noted that the plates 140 are of the same general formation as the stretcher end plates 70, and the disposition of the plates 140 and side walls of the pillow block 130 is such that the side walls of the pillow block and the plates 140 are in substantial vertical alignment, thus forming a column structure, which serves to take all loads asserted on the stretcher beams which tend to deflect the same. A bolt 141 passes through suitable perforations in plates 140 and a tubular spreader 141a prevents buckling of the plates when the nut is tightened on the bolt. Fig. 20 is a horizontal cross section taken through one of the stretcher members 40 shown in Fig. 19, and the same is directed to illustrate the alignment of plates 140 and the side walls of the pillow block 130. Fig. 21 is a cross-sectional elevation taken diagonally along the line 21—21 to more clearly illustrate the vertical alignment of the plates 140 on the walls of the pillow block 130.

In Figs. 24 to 27 inclusive, I show a modified form of header and stretcher end reinforcement and interengaging means, the reinforcing plates or elements being disposed exteriorally of the header and stretcher ends. In Fig. 24 the ends of the stretchers 41 are shown as being provided with U-shaped reinforcing members 42, which may be secured to the side walls of the stretcher ends in any suitable manner, such as rivets 43 and the connecting portions 42a of the U, serve also as a lateral bearing reinforcement for the bottom walls of the stretcher ends. Depending from the portions 42a are lugs 42c, which correspond in function to the depending portions 70b of the plates 70, shown in Figs. 6, 7, etc.

The header reinforcement comprises a U-shaped member 45, the legs 45a of which embrace the side walls of the header and there is provided horizontal lugs 45b, which fill the function of the lugs 90b of the plate members 90, shown on the header construction illustrated in Fig. 8, and hereinbefore described. The U-shaped member 45 may be secured to the side walls and the header in any convenient manner, such as rivets 46. A perforation 47, shown in Fig. 25, extends through the leg portions 45a, through the side walls of the header for the reception of the bolt 48, which serves to inter-connect the bonding ends of the stretcher and headers. A tubular spreader 48a prevents buckling of the side walls when the nut is tightened on the bolt. In this construction, bearing plates 49a are interposed between the top and bottom walls of the header and the adjacent upper course of the stretchers and the adjacent lower course of the stretchers for the bearing and lateral reinforcement purpose hereinbefore referred to. In this connection, it will be noted that the header reinforcement serves a threefold function of vertically reinforcing the side walls. It closes the header end and also serves as an interengaging means between the header and the lower course of stretchers, and the reinforcing members 42 on the stretchers and 45 on the headers are provided with suitable ribs 42d and 45d respectively, for increasing the column strength of the same. Thus, the various vertical reinforcing members and end walls of the headers and stretchers, when placed in the structure are in substantially vertical alignment, as illustrated in the vertical cross-sectional view taken along the line 27—27 of Fig. 26, and shown in Fig. 27.

Wherever the expression "vertical alignment direction", etc., has been used hereinbefore, it is to be understood that said expression is used in a relative sense, that is, the elements of the surfaces comprising the headers and stretches, when placed in the wall structure are normal to each other. As an example, in Fig. 3, the entire cribbing wall is shown inclined toward the bank of soil to be retained. Nevertheless, speaking in a relative sense, the headers and stretchers are in a vertical bonding relationship.

It will be seen from the above description that I have provided a metallic cribbing of great durability and dependability, and at the same time very economical to manufacture and erect. The parts thereof may be temporarily or permanently connected, or they may be assembled in one place and moved to another. The beams are of such light construction that one man may transport and place them, and yet the metal is so ∪nciently disposed therein as to enable them to carry heavy loads.

Another advantage of my invention is its adaptability in a wide range of forms to many varied engineering applications, both marine and land and by reason of the use of weather-proofed metal, permanence of construction is assured.

I claim:

1. A hollow metal cribbing beam comprising a top and side walls, the side walls having stiffening deformities shaped therein for increasing the beam load bearing capacity of said side walls and the beam having a transverse member extending between said side walls and secured thereto for increasing the compressive strength of the beam ends.

2. A hollow metal cribbing beam comprising a top and side walls formed from a single sheet of metal, the side walls having stiffening deformities shaped therein for increasing the beam load bearing capacity of said side walls and the beam having transverse members extending between inwardly disposed flanges on the bottom of said side walls and secured to the said flanges for increasing the strength of the beam body.

3. A hollow metal cribbing beam comprising a top and side walls integrally formed from a sheet of metal with rounded portions connecting the top and side walls, the side walls having stiffening deformities shaped therein for increasing the beam load capacity of said side walls and the beam having a transverse member connecting the bottoms of said side walls and secured thereto for increasing the strength of the beam throughout its length.

4. A hollow metal cribbing beam comprising a top and side walls integrally formed from a sheet of metal with rounded portions connecting the top and side walls and the beam having a transverse member connecting the bottoms of said side walls and secured thereto for increasing the strength of the beam throughout its length.

5. A cribbing beam comprising a single elongated sheet member constituting the body and a transverse sheet metal member secured thereto adjacent each end thereof, said body member having top, side and bottom walls, and said transverse members serving to reinforce the beam ends, whereby compressive loads exerted upon the beam ends will be transmitted from the top wall of the body member to a bottom wall thereof.

6. A cribbing beam comprising a single elongated sheet member constituting the body and a transverse sheet metal member secured thereto adjacent each end thereof, said body member having top, side and bottom walls, connected by rounded portions of the body member and said transverse members serving to reinforce the beam ends by contacting with the top and bottom walls thereof, whereby compressive loads exerted upon the top wall of the beam end will be transmitted from said top wall of the body member to the bottom wall thereof while preventing lateral bulging of the side wall ends.

7. A cribbing beam comprising a single elongated sheet member constituting the body and a transverse sheet metal member secured thereto adjacent each end thereof, said body member having a top wall, two side walls, two bottom walls, the bottom walls being disposed in a common plane and said transverse members serving to reinforce the beam ends by interiorly contacting with the top wall and both of said bottom walls, whereby compressive loads exerted upon the beam ends will be transmitted from the top wall of the body member to a bottom wall thereof.

8. A hollow metal cribbing beam, comprising a single, elongated sheet member constituting the body of the beam, said member having a top wall, side walls and two bottom walls, all integrally connected, transversely extending members connected to the bottom walls of the beam body at spaced positions lengthwise of the beam body, and a transversely disposed sheet metal member attached to the walls of the beam body adjacent the ends thereof, said transversely disposed members being provided with vertically extending flanges affording attachment to the side walls of the beam body, and serving, together with the main portions of the transverse members, to increase the compressive strength of the beam ends in carrying vertically imposed loads.

9. A hollow metal cribbing beam, comprising a single elongated sheet member, constituting the body of the beam, said member having a top wall, side walls having depressions formed therein to increase the inherent beam strength of that portion of the sheet comprising the side walls, and two bottom walls, all the walls being integrally connected by rounded portions extending longitudinally of the beam structure, said bottom walls being disposed in a common plane, transversely extending members connected to said bottom walls to tie the same together, and a transversely disposed sheet member attached to the walls of the beam body adjacent the ends thereof, said transversely disposed members being provided with vertically extending deformations to increase the inherent load bearing column strength of the sheet of metal comprising the same, said last named member serving to prevent transverse bulging of the side wall ends of the beam when compressive loads are exerted upon the beam ends when in use.

10. A hollow metal cribbing beam, comprising a single, elongated sheet member constituting the body of the beam, said member having a top wall and side walls paneled substantially throughout the length of the beam, said paneling terminating short of the beam ends, all of said walls being integrally connected, and a transversely disposed sheet metal member attached to the side walls of the beam body adjacent the ends thereof, said transversely disposed members being provided with vertically extending deformations to thereby provide increased bearing area for said top wall.

11. A hollow metal cribbing header beam comprising a top and side walls and having a plurality of transversely disposed sheet metal members extending between the side walls and attached to the beam adjacent the ends thereof and in spaced apart relation.

12. A hollow metal cribbing header beam comprising a top and side walls, having spaced apart longitudinal flanges forming the bottom of the beam structure, means for connecting said flanges, there being transversely disposed sheet metal members extending between the side walls and attached to the header beam, adjacent the ends thereof and in spaced apart relation, the spacing between the transversely disposed members being of a dimension equal to or less than the width of the sheet metal stretcher beams with which the header is to be used.

13. A hollow metal cribbing header beam comprising a top and side walls and having a plurality of transversely disposed sheet metal members extending between the side walls and attached to the header beam adjacent the ends thereof and serving to increase the compressive strength of said header ends, and means associated with the header beam end to interconnect the beam end with another beam when assembled in a cribbing structure.

14. A hollow metal cribbing header beam comprising a top and side walls and having a transversely disposed sheet metal member attached to the beam adjacent the ends thereof and a compression reinforcement member associated with the top wall of the beam and the transverse member for increasing the compression bearing strength of the beam ends.

15. A hollow metal cribbing beam, comprising a single, elongated sheet member, constituting the body of the beam, said member having a top wall, side walls and two bottom walls, all integrally connected, transversely extending members connected to the bottom walls of the beam body at spaced positions lengthwise of the beam body, a transversely disposed sheet metal member attached to the walls of the beam body adjacent the ends thereof, said transversely disposed member being provided with means affording attachment to a header member.

16. In a cribbing structure formed of sheet metal hollow members, the combination of a header comprising a single sheet metal member formed to provide a top wall and side walls and stretcher members similarly formed, the headers and stretchers being laid in the structure with the ends of longitudinally adjacent stretchers in substantially equal bonding relationship to the end of a header member, the header members lying in directions substantially normal to the stretcher lengths, there being means extending longitudinally of the stretcher ends for securing the bonding header and stretcher ends together, whereby the assembled structure may be transported.

17. In a cribbing structure formed of sheet metal hollow members, the combination of a header comprising a single sheet metal member formed to provide a top wall and side walls and stretcher members similarly formed, the headers and stretchers being laid in the structure with the ends of longitudinally adjacent stretchers in substantially equal bonding relationship to the end of a header member, the header members lying in directions substantially normal to the stretcher lengths, there being means secured to the header and affording securement to the stretcher ends, which are in bonding relation with the header end, and means for capping the ultimately exposed ends of the headers.

18. A cribbing beam comprising an elongated sheet metal structure of hollow formation and having a transverse sheet metal member secured thereto adjacent each end thereof, said transverse members serving to reinforce the hollow beam ends, whereby compressive loads exerted upon the beam ends will be transmitted from the ends of the top wall of the beam vertically downward through the transverse members and thus prevent bulging of the ends of the side walls of the beam structure and said transverse members being formed to provide means to interconnect the beam end with another cribbing beam when the same are assembled in the cribbing structure.

19. A cribbing beam comprising an elongated sheet metal structure of hollow formation and having a transverse sheet metal member secured thereto adjacent each end thereof, said transverse members being formed and attached to reinforce the hollow beam ends both vertically and transversely, whereby compressive loads exerted upon the beam ends, will be transmitted from the ends of the top wall of the beam vertically downward through the transverse members, and thus prevent bulging of the ends of the side walls of the beam structure.

20. In a cribbing structure comprising elongated hollow sheet metal beams, a header provided with an inner transverse wall adjacent its load bearing ends, stretcher members arranged in vertical bonding relation to the header and in substantially equal bonding relation thereto, the stretchers being arranged in the structure in longitudinal alignment end to end, and the stretcher ends being provided with transverse walls adjacent the ends thereof and disposed at such position relative to the beam ends that the double walls of the header ends will have some part thereof in vertical alignment with the transverse walls of the stretcher ends.

21. A cribbing beam comprising an elongated sheet metal structure of hollow quadrilateral formation with top and side walls and having sheet metal members secured thereto adjacent each end thereof, said members being arranged to cooperate with the ends of the side walls of the beam, whereby compressive loads exerted upon the beam ends will be transmitted from the ends of the top wall of the beam vertically downward through said members, and thus prevent bulging of the ends of the side walls of the beam structure and said members being formed to provide means to interconnect the beam end with another cribbing beam when the same are assembled in the cribbing structure.

22. In a cribbing structure the combination of header members and stretcher members of hollow sheet metal having the cross section of a parallelogram, the stretchers being arranged in the structure in longitudinally aligned relation and the header members being placed in substantially equal bonding relationship with adjacent ends of header members, the header members and the stretcher members being provided with compression walls arranged to cooperate with the ends of the side walls of the headers and stretchers, whereby the said walls lie within the overlapping bonding regions of the headers and stretchers.

23. In a cribbing structure the combination of header members and stretcher members of hollow sheet metal formation, the stretchers being ar-